US011487153B2

(12) United States Patent
Kim et al.

(10) Patent No.: US 11,487,153 B2
(45) Date of Patent: Nov. 1, 2022

(54) BACKLIGHT DEVICE AND HOLOGRAPHIC 3-DIMENSIONAL IMAGE DISPLAY DEVICE INCLUDING THE SAME

(71) Applicants: Samsung Display Co., Ltd., Yongin-si (KR); Seoul National University R&DB Foundation, Seoul (KR)

(72) Inventors: Sang Ho Kim, Yongin-si (KR); Duk Ho Lee, Seoul (KR); Young Chan Kim, Yongin-si (KR); Ki Seung Bang, Seoul (KR); Chang Won Jang, Seoul (KR); Ji Won Lee, Yongin-si (KR); Cheon Myeong Lee, Yongin-si (KR); Byoung Ho Lee, Seoul (KR)

(73) Assignees: Samsung Display Co., Ltd., Yongin-si (KR); Seoul National University R&DB Foundation, Seoul (KR)

( * ) Notice: Subject to any disclaimer, the term of this patent is extended or adjusted under 35 U.S.C. 154(b) by 144 days.

(21) Appl. No.: 17/001,395

(22) Filed: Aug. 24, 2020

(65) Prior Publication Data

US 2021/0088849 A1 Mar. 25, 2021

(30) Foreign Application Priority Data

Sep. 23, 2019 (KR) .......................... 10-2019-0116777

(51) Int. Cl.
*G02F 1/13357* (2006.01)
*G03H 1/32* (2006.01)

(52) U.S. Cl.
CPC ......... *G02F 1/133606* (2013.01); *G03H 1/32* (2013.01); *G03H 2222/22* (2013.01); *G03H 2223/14* (2013.01); *G03H 2225/13* (2013.01)

(58) Field of Classification Search
CPC ................ G02F 1/133606; G03H 1/32; G03H 2222/22; G03H 2223/14; G03H 2225/13
USPC .......................................................... 349/63
See application file for complete search history.

(56) References Cited

U.S. PATENT DOCUMENTS

| 4,521,075 A | 6/1985 | Obenschain et al. |
| 6,169,634 B1 * | 1/2001 | Sirat ...................... G02B 27/48 |
| | | 359/317 |
| 9,069,183 B2 * | 6/2015 | Moffatt ................. H01S 3/0057 |
| 9,696,687 B2 | 7/2017 | Sung et al. |
| 10,038,499 B2 * | 7/2018 | Birnbaum ............ H04B 10/541 |

(Continued)

FOREIGN PATENT DOCUMENTS

KR 10-2015-0066183 A 6/2015

OTHER PUBLICATIONS

Rebane, A., "Associative Space-And-Time Domain Recall of Picosecond Light Signals Via Photochemical Hole Burning Holography," Optics Communications, vol. 65, No. 3, Feb. 1988, 4 pages.

*Primary Examiner* — Charles S Chang
(74) *Attorney, Agent, or Firm* — Lewis Roca Rothgerber Christie LLP

(57) ABSTRACT

A backlight device includes: a light source to emit coherent light; an optical path difference generator on the light source, the optical path difference generator including an incident surface and a plurality of light emitting surfaces, the light emitting surfaces being parallel to the incident surface and having different separation distances from the incident surface; a light condenser on the optical path difference generator; a diffuser on the light condenser; and a collimator on the diffuser.

17 Claims, 13 Drawing Sheets

(56) References Cited

U.S. PATENT DOCUMENTS

2013/0242208 A1* 9/2013 Huang .................. H04N 9/315
   349/5
2018/0292669 A1 10/2018 Furstenberg et al.

* cited by examiner

BACKLIGHT DEVICE AND HOLOGRAPHIC 3-DIMENSIONAL IMAGE DISPLAY DEVICE INCLUDING THE SAME

CROSS-REFERENCE TO RELATED APPLICATION

This application claims priority to and the benefit of Korean patent application number 10-2019-0116777 filed on Sep. 23, 2019, in the Korean Intellectual Property Office, the entire disclosure of which is incorporated herein by reference.

BACKGROUND

1. Field

Aspects of embodiments of the present disclosure relate to a backlight device and a holographic 3-dimensional image display device including the same.

2. Description of the Related Art

Holography technology for displaying a 3-dimensional (3D) stereoscopic image uses a principle of recording an interference signal acquired through superposition of light reflected by an object (or an object wave) and light having coherence (e.g., a coherent light, a reference light, or a reference wave), and reproducing the interference signal.

Recordation of an interference pattern on a film is referred to as a hologram. The interference pattern is formed by joining an object wave, which is formed by scattering of laser light having high coherence through collision with an object, with a reference wave incident in a different direction. When the object wave and the reference wave are joined, the interference pattern is formed by interference therebetween, and intensity and phase information of the waves of light are recorded in such an interference pattern.

Restoration of the stereoscopic image, which is recorded as the hologram, into a 3D image by irradiating reference light onto the interference pattern is referred to as holography. A holographic 3D image display device includes a spatial light modulator configured to form an interference pattern according to interference pattern data, and a backlight unit configured to irradiate a reference wave (or coherent light) onto the spatial light modulator.

The backlight unit includes a diffusion plate to uniformly provide coherent light to the whole of the spatial light modulator. However, when coherent light is irradiated onto the diffusion plate, a speckle (or speckle pattern) may be generated in a 3D image while the coherent light is being partially mutually interfered by a random phase pattern of the diffusion plate.

The above information disclosed in this Background section is for enhancement of understanding of the background of the present disclosure, and therefore, it may contain information that does not constitute prior art.

SUMMARY

One or more embodiments of the present disclosure are directed to a backlight device capable of reducing a speckle of a 3D image, and a holographic 3D image display device.

According to an example embodiment of the present disclosure, a backlight device includes: a light source configured to emit coherent light; an optical path difference generator on the light source, the optical path difference generator including an incident surface and a plurality of light emitting surfaces, the light emitting surfaces being parallel to the incident surface and having different separation distances from the incident surface; a light condenser on the optical path difference generator; a diffuser on the light condenser; and a collimator on the diffuser.

In an example embodiment, the optical path difference generator may include: a first layer; and a second layer on the first layer, the second layer partially overlapping with the first layer. A portion of the first layer may be exposed by the second layer, and may include a first light emitting surface from among the plurality of light emitting surfaces, and at least a portion of the second layer may overlap with the first layer, and may include a second light emitting surface from among the plurality of light emitting surfaces.

In an example embodiment, a thickness of the second layer may be greater than a temporal coherence length of the coherent light.

In an example embodiment, the temporal coherence length may be defined as a distance where the coherent light is moved for a delay time, and the delay time may be defined as an amount of time until coherence between the coherent light and delayed light is decreased to a value of 0, the coherence being obtained by delaying the coherent light by the delay time.

In an example embodiment, a thickness of the second layer may be equal to that of the first layer.

In an example embodiment, an area of the second layer may be less than that of the first layer in a plan view.

In an example embodiment, an area of the first light emitting surface may be equal to that of the second light emitting surface.

According to an example embodiment of the present disclosure, a display device includes: a backlight device; and a light modulator on the backlight device. The backlight device includes: a light source configured to emit coherent light; and an optical path difference generator on the light source, the optical path difference generator including an incident surface and a plurality of light emitting surfaces, the light emitting surfaces being parallel to the incident surface and having different separation distances from the incident surface.

In an example embodiment, the light source may include: a display panel including a plurality of pixels, each of the pixels including a light emitting element; and a first collimator on the display panel, the first collimator including a plurality of collimating lenses respectively corresponding to the pixels. The optical path difference generator may include a pattern including each of the light emitting surfaces, the pattern being repeatedly arranged, and the pattern of the optical path difference generator may correspond to at least one pixel.

In an example embodiment, the light modulator may include a liquid crystal display panel including a plurality of liquid crystal elements respectively corresponding to the pixels.

In an example embodiment, the pattern may include: a first sub-pattern at a first layer; and a second sub-pattern at a second layer different from the first layer, the second sub-pattern having an area smaller than that of the first sub-pattern. A portion of the first sub-pattern may be exposed by the second sub-pattern, and may include a first light emitting surface from among the plurality of light emitting surfaces, and at least a portion of the second sub-pattern may overlap with the first sub-pattern, and may include a second light emitting surface from among the plurality of light emitting surfaces.

In an example embodiment, each of the first sub-pattern and the second sub-pattern may have a circular planar shape or a quadrangular planar shape.

In an example embodiment, the pattern may include: a first layer having a first opening; and a second layer on the first layer, the second layer having a second opening overlapping with the first opening. A portion of the first layer may be exposed by the second opening, and may include a first light emitting surface from among the plurality of light emitting surfaces, and at least a portion of the second layer may not overlap with the first opening, and may include a second light emitting surface from among the plurality of light emitting surfaces.

In an example embodiment, the optical path difference generator may include a first layer and a second layer on the first layer; the first layer may have a first opening having a width, the first opening extending in a first direction, and being repeatedly arranged along a second direction crossing the first direction; and the second layer may include a second opening having a width, the second opening extending in the second direction, and being repeatedly arranged along the first direction.

In an example embodiment, a thickness of the first layer may be greater than a temporal coherence length of the coherent light, and a thickness of the second layer may be greater than that of the first layer.

In an example embodiment, the pattern of the optical path difference generator may correspond to at least two of the pixels; the optical path difference generator may include a first layer and a second layer on the first layer; each of the first layer and the second layer may have an opening extending in a first direction, the opening being repeatedly arranged along a second direction crossing the first direction; and the opening of the first layer may partially overlap with the opening of the second layer.

In an example embodiment, the backlight device may further include: a light condenser on the optical path difference generator; a diffuser on the light condenser; and a second collimator on the diffuser.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
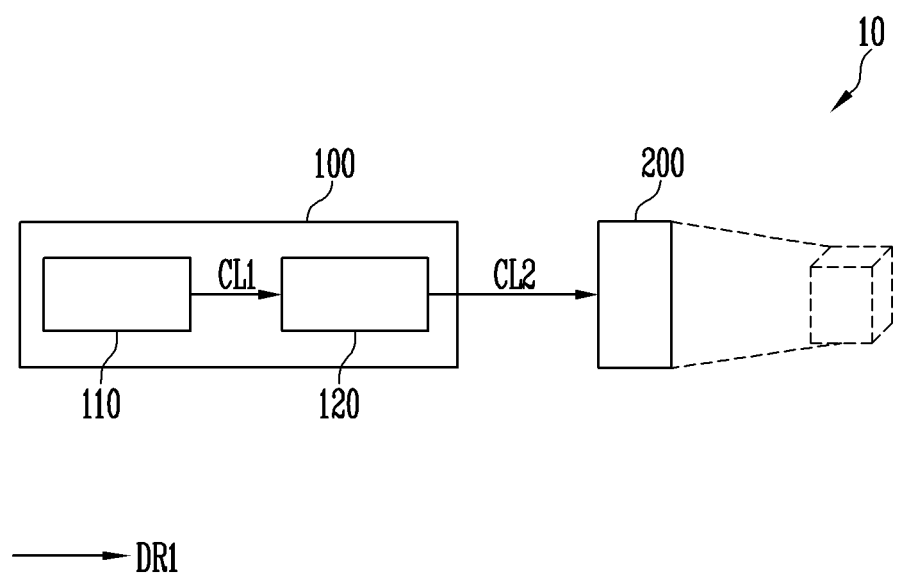
FIG. 1 is a diagram illustrating a display device in accordance with an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with an embodiment of the present disclosure.

Referring to FIG. 1, the display device 10 (e.g., a 3-dimensional image display device or a holographic 3-dimensional image display device) may include a backlight unit (e.g., a backlight device) 100, and a light modulator (e.g., a spatial light modulator) 200.

The backlight unit 100 may generate coherent light, and may emit the coherent light in a first direction DR1 (e.g., an upper direction or a front direction). The coherent light may refer to two or more lights capable of causing interference because phase and frequency (or wavelength) are temporally or spatially constant. For example, the coherent light may be laser light. Coherence is divided into spatial coherence and temporal coherence. The spatial coherence may be determined by a degree to which the wave front of advancing light is aligned, and the temporal coherence may be determined by a time for which a correlation between time and intensity is maintained or substantially maintained when an intensity of light is measured at one point according to the time.

The backlight unit 100 may include a light source (e.g., a coherent light source) 110 and a speckle reducer 120.

The light source 110 may emit first coherent light CL1 in the first direction DR1. For example, the light source 110 may be a laser light source. However, the present disclosure is not limited thereto, and the light source 110 may be implemented as a display panel including a light emitting element for emitting a single colored light. This will be described in more detail below with reference to FIG. 4.

The speckle reducer 120 (or optical path difference generator) may include a plurality of optical paths disposed in the first direction DR1 with respect to the light source 110.

The plurality of optical paths may have different lengths from each other. The first coherent light CL1 irradiated from the light source 110 passes through the optical paths, and a second coherent light CL2 may be emitted through the speckle reducer 120. The second coherent light CL2 may include a plurality of lights (e.g., a plurality of light waves) having different phase distributions from each other according to the optical paths. Accordingly, the spatial coherence of the second coherent light CL2 may be reduced. A more detailed configuration of the speckle reducer 120 will be described below with reference to FIG. 2.

The light modulator 200 may be disposed in the first direction DR1 with respect to the backlight unit 100, and may express phase information of an object wave of an object by modulating coherent light (e.g., the second coherent light CL2) provided from the backlight unit 100. For example, the light modulator 200 may express a 3-dimensional (3D) image through the modulation of the coherent light.

In an embodiment, the light modulator 200 may be implemented as a liquid crystal display panel, and may change a phase and a polarization state of the coherent light by using a double refraction property of liquid crystals.

As described above, because the coherent light (e.g., the second coherent light CL2) provided from the speckle reducer 120 to the light modulator 200 includes the plurality of lights having different phases from each other, speckles may be different from each other even when the speckles are generated by the respective lights. Speckle brightness (e.g., a brightness of the speckle with respect to an average brightness) may be reduced when the different speckles overlap with each other, and thus, the speckle (e.g., any of the speckles) may not be viewed (e.g., may not be viewable) in a 3-dimensional image.

Figure 2:
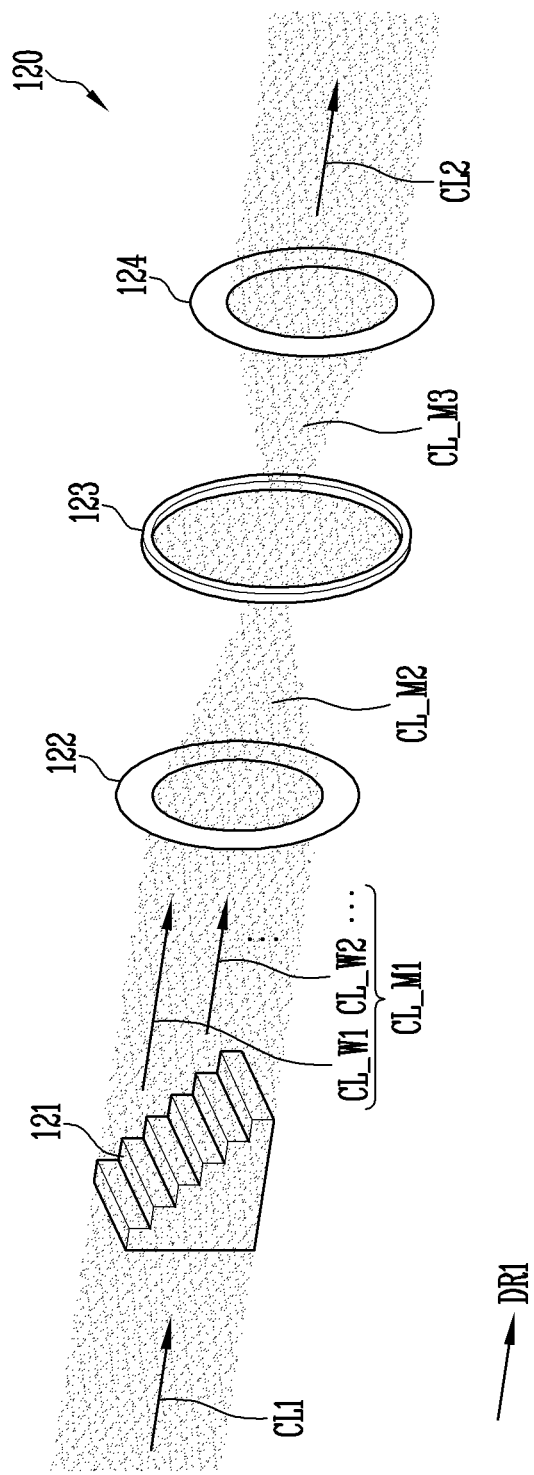
FIG. 2 is a diagram illustrating an example of a speckle reducer included in the display device shown in FIG. 1.

FIG. 2 is a diagram illustrating an example of the speckle reducer included in the display device shown in FIG. 1.

Referring to FIGS. 1 and 2, the speckle reducer 120 may include an optical path difference generator (e.g., an optical structure) 121, a light condenser (e.g., a condensing lens) 122, a diffuser 123, and a collimator (e.g., a collimating lens) 124.

The optical path difference generator 121 may be disposed in the first direction DR1 with respect to the light source 110. The optical path difference generator 121 may have an incident surface (e.g., one incident surface), and a plurality of light emitting surfaces. The light emitting surfaces may be parallel to the incident surface, may have different separation distances from the incident surface, and may provide different optical paths with respect to the first coherent light CL1 in a relationship with the incident surface.

The optical path difference generator 121 will be described in more detail with reference to FIG. 3. After the optical path difference generator 121 is described in more detail, the light condenser 122, the diffuser 123, and the collimator 124 will be described in more detail.

Figure 3:
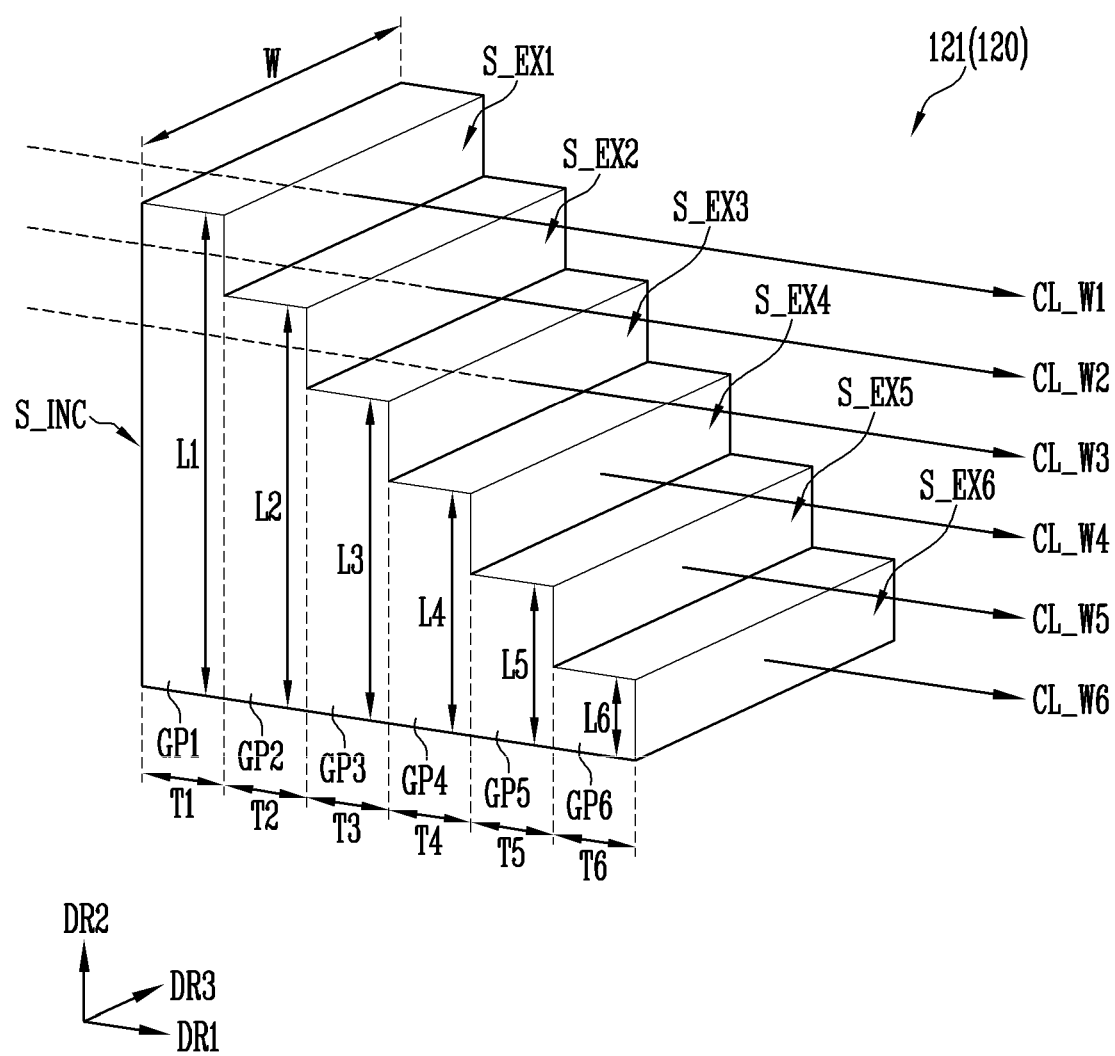
FIG. 3 is a diagram illustrating an example of an optical path difference generator included in the speckle reducer shown in FIG. 2.

FIG. 3 is a diagram illustrating an example of the optical path difference generator included in the speckle reducer shown in FIG. 2.

Referring to FIGS. 2 and 3, the optical path difference generator 121 (or the speckle reducer 120) may include a plurality of layers GP1 to GP6. Each of the plurality of layers GP1 to GP6 may be implemented as a plate including (e.g., made of) a material through which light may be transmitted, for example, such as a glass plate. The layers GP1 to GP6 may be disposed in parallel to each other. In other words, the optical path difference generator 121 may be configured with a plurality (e.g., a pile) of glass plates (e.g., echelons) arranged in a step shape.

A first layer GP1 may be disposed nearest to (e.g., most adjacent to) the light source 110 (e.g., see FIG. 1) from among the layers GP1 to GP6, and may include (e.g., may form or may constitute) an incident surface S_INC of the optical path difference generator 121.

A second layer GP2 may be disposed on the first layer GP1, and may partially overlap with the first layer GP1 (e.g., in the first direction DR1). An area of the second layer GP2 may be smaller than that of the first layer GP1. For example, a width W of the second layer GP2 in a third direction DR3 may be equal to or substantially equal to that of the first layer GP1 in the third direction DR3, and a length (e.g., a second length) L2 of the second layer GP2 in a second direction DR2 may be shorter than a length (e.g., a first length) L1 of the first layer GP1 in the second direction DR2. However, the present disclosure is not limited thereto, and the area of the second layer GP2 may be equal to or substantially equal to that of the first layer GP1. This will be described in more detail below with reference to FIG. 9A.

Although FIG. 3 illustrates an example embodiment where three side surfaces of the second layer GP2 are disposed on the same plane as three side surfaces of the first layer GP1, or in accordance with (e.g., corresponding to or aligned with) the three side surfaces of the first layer GP1, the present disclosure is not limited thereto, and the arrangement of the first layer GP1 and the second layer GP2 is not limited to the embodiment shown in FIG. 3.

A portion of the first layer GP1, which is exposed by (e.g., which does not overlap with) the second layer GP2, may include (e.g., may form or may constitute) a first light emitting surface S_EX1 from among light emitting surfaces S_EX1 to S_EX6. At least a portion of the second layer GP2, which overlaps with the first layer GP1 (e.g., in the first direction DR1), may include (e.g., may form or may constitute) a second light emitting surface S_EX2 from among the light emitting surfaces S_EX1 to S_EX6. A side surface (e.g., a side surface in the second direction DR2 crossing or perpendicular to the first direction DR1) of the second layer GP2 may be parallel to or substantially parallel to the first coherent light CL1 (e.g., see FIG. 2) advancing in the first direction DR1.

Similarly, a third layer GP3 may be disposed on the second layer GP2, and may partially overlap with the second layer GP2 (e.g., in the first direction DR1). An area of the third layer GP3 may be smaller than that of the second layer GP2. A portion of the second layer GP2, which overlaps with the first layer GP1 (e.g., in the first direction DR1) and is exposed by (e.g., which does not overlap with) the third layer GP3, may include (e.g., may form or may constitute) the second light emitting surface S_EX2. In other words, an (n+1)th layer GPn+1 (where n is a positive integer, as an example, FIG. 3 only illustrate the first layer GP1 to the sixth layer GP6) may be disposed on an nth layer GPn, and may partially overlap with the nth layer GPn. An area of the (n+1)th layer GPn+1 may be smaller than that of the nth layer GPn. A portion of the nth layer GPn, which overlaps with an (n−1)th layer GPn−1 and is exposed by the (n+1)th layer GPn+1, may include (e.g., may form or may constitute) an nth light emitting surface S_EXn (as an example, FIG. 3 only illustrate the first light emitting surface S_EX1 to the sixth light emitting surface S_EX6).

Accordingly, as shown in FIG. 3, a fourth layer GP4 may be disposed on the third layer GP3, and may partially overlap with the third layer GP3. The fourth layer GP4 may include (e.g., may form or may constitute) a fourth light emitting surface S_EX4. A fifth layer GP5 may be disposed on the fourth layer GP4, and may partially overlap with the fourth layer GP4. The fifth layer GP5 may include (e.g., may form or may constitute) a fifth light emitting surface S_EX5. Further, a sixth layer GP6 may be disposed on the fifth layer GP5, and may partially overlap with the fifth layer GP5. The sixth layer GP6 may include (e.g., may form or may constitute) a sixth light emitting surface S_EX6.

A first wave CL_W1 emitted through the first light emitting surface S_EX1 may have a path difference corresponding to a first thickness T1 (e.g., in the first direction DR1) of the first layer GP1 with respect to the incident first coherent light CL1 (e.g., see FIG. 2). Similarly, a second wave CL_W2 emitted through the second light emitting surface S_EX2 may have a path difference corresponding to a sum of a second thickness T2 (e.g., in the first direction DR1) of the second layer GP2 and the first thickness T1 of the first layer GP1. A third wave CL_W3 emitted through the third light emitting surface S_EX3 may have a path difference corresponding to a sum of thickness (e.g., T1+T2+T3) of the first to third layers GP1, GP2, and GP3, a fourth wave CL_W4 emitted through the fourth light emitting surface S_EX4 may have a path difference corresponding to a sum of thickness (e.g., T1+T2+T3+T4) of the first to fourth layers GP1 to GP4, and the like. In other words, an nth wave CL_Wn (as an example, FIG. 3 only illustrate the first wave CL_W1 to the sixth wave CL_W6) emitted through the nth light emitting surface S_EXn may have a path difference corresponding to a sum of thickness (e.g., T1+T2+ . . . +Tn) of the first to nth layers GP1 to GPn.

In some embodiments, each of the thicknesses T1 to T6 of the first to sixth layers GP1 to GP6 may be greater than a temporal coherence length of the coherent light (e.g., the first coherent light CL1 shown in FIG. 2). The temporal coherence length may be defined as a distance where the coherent light is moved for a delay time, and the delay time may be defined as an amount of time that is suitable or desired until coherence between the coherent light (e.g., the first wave CL_W1) and a delayed light (e.g., the second wave CL_W2) is decreased to a value of 0, the coherence being obtained by delaying the coherent light by the delay time. The temporal coherence length may be in proportion to the speed of light (e.g., the coherent light), and may be in inverse proportion to the refractive index (e.g., the square root of the refractive index) of a medium. For example, the temporal coherence length may be a few μm to a few hundred μm. In some embodiments, the spatial coherence of the first to sixth waves CL_W1 to CL_W6 may be reduced.

In an embodiment, the thicknesses T1 to T6 of the first to sixth layers GP1 to GP6 may be the same or substantially the same as each other. For example, each of the thicknesses T1 to T6 of the first to sixth layers GP1 to GP6 may be equal to or substantially equal to the temporal coherence length. A total thickness of the optical path difference generator 121 may be reduced or minimized.

In an embodiment, the light emitting surfaces S_EX1 to S_EX6 may have the same or substantially the same area as each other. Therefore, the first to sixth waves CL_W1 to CL_W6 having different path differences (or different phases) may be generated at the same or substantially the same (or similar) rates.

Although FIG. 3 illustrates an example embodiment where six layers GP1 to GP6 are included in the optical path difference generator 121, the present disclosure is not limited thereto, and the optical path difference generator 121 may have any suitable or desired number of layers (e.g., less than six layers or more than six layers). For example, the speckle brightness in a 3-dimensional image may be decreased according to the square root of the number of the layers GP1 to GP6, and the optical path difference generator 121 may include more or less layers (e.g., seven or more layers or five or less layers) in consideration of a relationship between a decrease degree (e.g., a decrease amount) of the speckle brightness and the number of the layers.

Referring back to FIG. 2, the light condenser 122 may be disposed in the first direction DR1 with respect to the optical path difference generator 121, and may condense (e.g., may concentrate) the plurality of lights (e.g., the first to sixth waves CL_W1 to CL_W6) transmitted through the optical path difference generator 121 (e.g., may condense a light CL_M1 of which the spatial coherence is decreased) to generate a condensed light CL_M2.

The diffuser 123 may be disposed in the first direction DR1 with respect to the light condenser 122, and may diffuse the condensed light CL_M2 to generate diffused light CL_M3. Coherent light may be provided (e.g., may be uniformly provided) to an entirety (e.g., to a whole) of the light modulator 200 through the diffuser 123. The diffuser 123 may be disposed at a focal distance of the light condenser 122.

The collimator 124 may be disposed in the first direction DR1 with respect to the diffuser 123, and may convert the diffused light CL_M3 into parallel light (e.g., CL2). The collimator 124 may be disposed to be spaced apart from the diffuser 123 by the focal distance.

Different phases may be provided to the light CL_M1 of which the spatial coherence is decreased by the diffuser 123, and the light converted by the collimator 124 may be regarded as overlapping lights having different phases from each other.

As described with reference to FIG. 1, the parallel light may be provided to the light modulator 200 as the second coherent light CL2. The speckle brightness may be reduced when different speckle patterns generated by the parallel light (e.g., the lights having different phases from each other) overlap with each other.

As described with reference to FIGS. 2 and 3, the optical path difference generator 121 (or the speckle reducer 120) may provide different optical paths, different phases may be provided to the coherent light transmitted through the optical path difference generator 121, and different speckles may be generated and may overlap with each other due to the different phases. Thus, the speckle brightness may be reduced, and the speckle (e.g., any speckle) may not be viewed (e.g., may not be easily viewable or may not be easily noticeable).

Although FIG. 2 illustrates an example embodiment where the speckle reducer 120 includes the light condenser 122, the diffuser 123, and the collimator 124, in addition to the optical path difference generator 121, the present disclosure is not limited thereto. For example, in another embodiment, the speckle reducer 120 may include the optical path difference generator 121, but the light condenser 122, the diffuser 123, and/or the collimator 124 may be omitted (e.g., may not be included).

Figure 4:
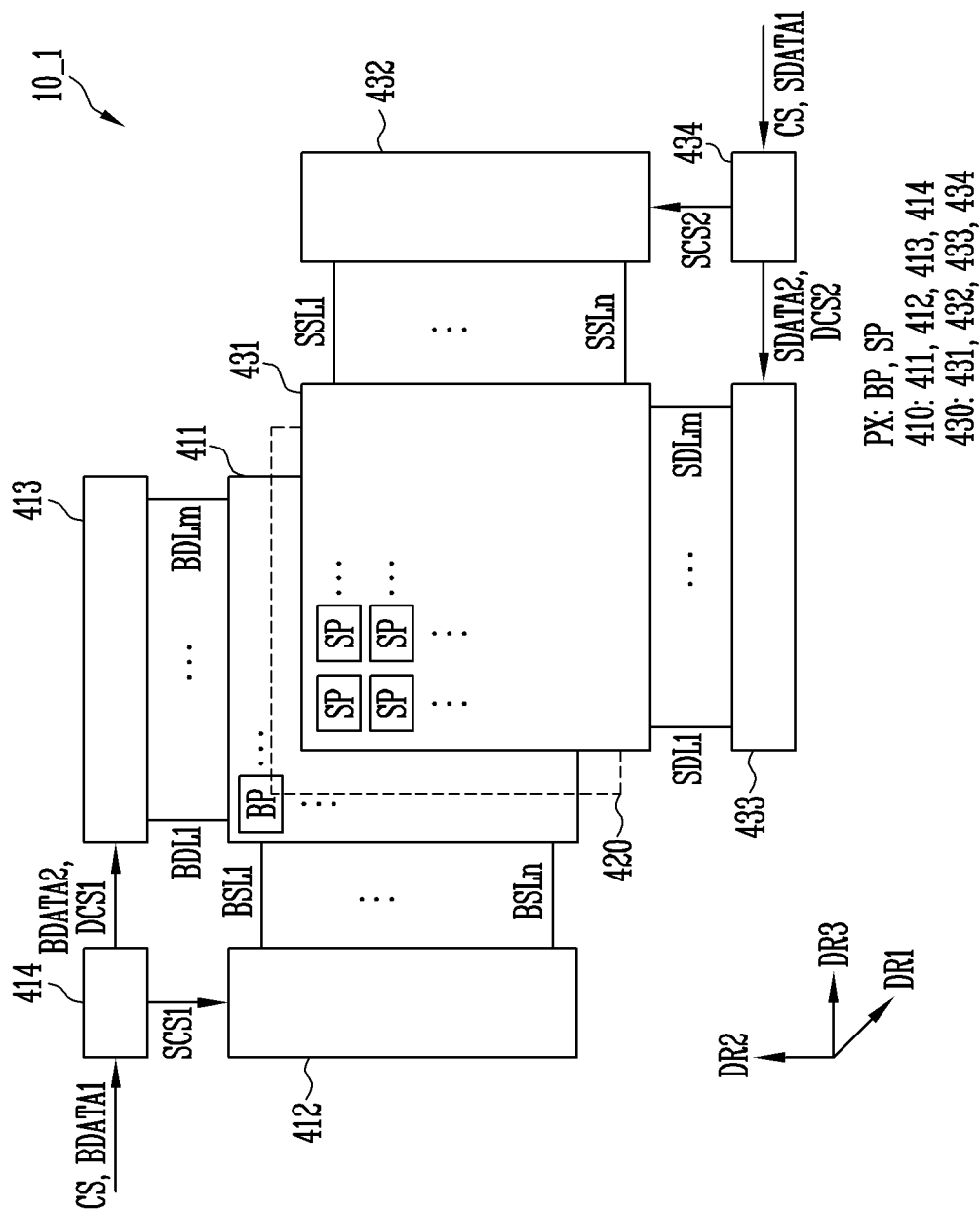
FIGS. 4-5 are diagrams illustrating an example of the display device shown in FIG. 1.
Figure 5:
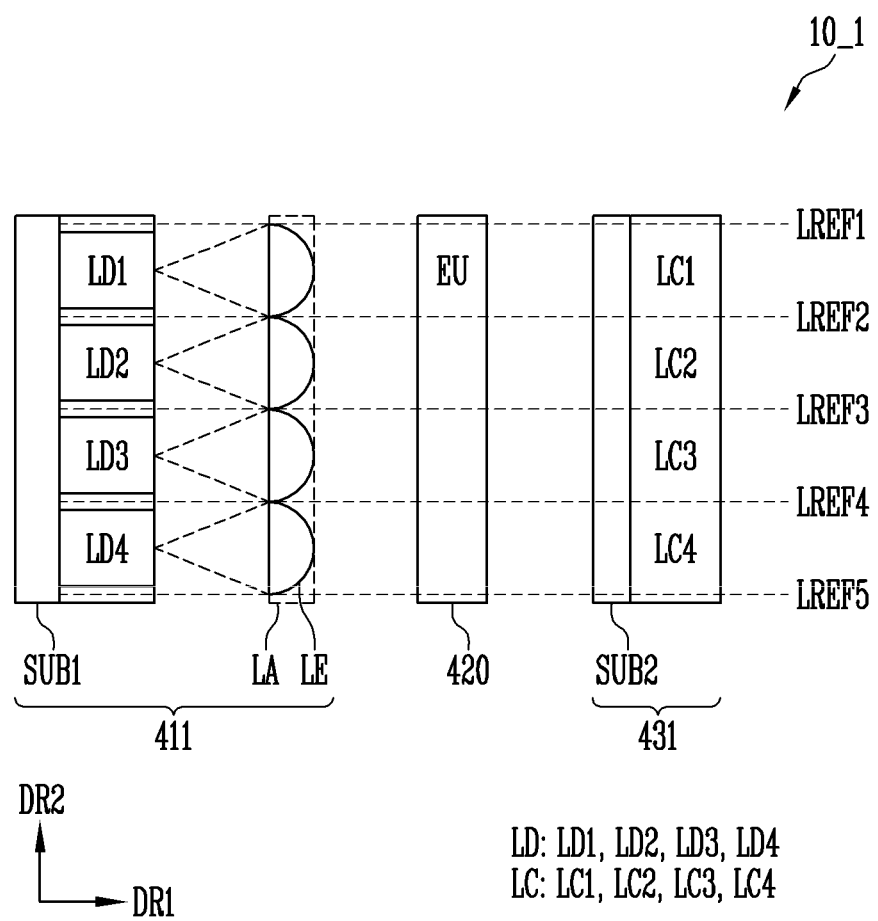

FIGS. 4 and 5 are diagrams illustrating an example of the display device shown in FIG. 1. In FIG. 4, a plan view of a display device 10_1 including a light source 410 and a light modulator 430 is illustrated. As used herein, a plan view refers to a view from a plane that is parallel to or substantially parallel to (or normal to) a top surface of the relevant component, layer, or element (e.g., the display device 10_1).

In FIG. 5, a side view (e.g., a cross-sectional view) of a portion of the display device 10_1 including the light source 410 is illustrated.

Referring to FIGS. 1 and 4, the display device 10_1 may include a light source 410, a speckle reducer 420 (e.g., or an optical path difference generator), and a light modulator 430.

The light source 410 may be implemented as a display device. For example, the light source 410 may be implemented as an organic light emitting display device. However, the present disclosure is not limited thereto, and the light source 410 may be implemented as an inorganic light emitting display device.

The light source 410 may include a first display panel 411, a first scan driver 412, a first data driver 413, and a first controller 414.

The first display panel 411 may include first scan lines (e.g., first to nth backlight scan lines) BSL1 to BSLn (where n is a positive integer), first data lines (e.g., first to mth backlight data lines) BDL1 to BDLm (where m is a positive integer), and first pixels BP. The first scan lines BSL1 to BSLn may be arranged with each other along the second direction DR2, and each of the first scan lines BSL1 to BSLn may extend in the third direction DR3. The first data lines BDL1 to BDLm may be arranged with each other along the third direction DR3, and each of the first data lines BDL1 to BDLm may extend in the second direction DR2.

The first pixels BP may be disposed at (e.g., in or on) regions (e.g., crossing regions) defined by the first scan lines BSL1 to BSLn and the first data lines BDL1 to BDLm, and each of the first pixels BP may be connected to at least one of the first scan lines BSL1 to BSLn and to one of the first data lines BDL1 to BDLm. Each of the first pixels BP may include a light emitting element (e.g., a light emitting diode), and a transistor (e.g., at least one transistor) that provides a driving current corresponding to a first data signal to the light emitting element. The light emitting element emits light having a desired luminance corresponding to the driving current, and may be an organic light emitting element or inorganic light emitting element.

The first scan driver 412 may generate a first scan signal according to (e.g., based on) a first scan control signal SCS1, and may provide (e.g., may sequentially provide) the first scan signal to the first scan lines BSL1 to BSLn. The first scan control signal SCS1 may include a start signal, one or more clock signals, and/or the like, and may be provided from the first controller 414. For example, the first scan driver 412 may include a shift register (e.g., a stage) that sequentially generates and outputs the first scan signal in the form of a pulse, which corresponds to the start signal in the form of a pulse, by using the clock signals.

The first data driver 413 may generate first data signals according to (e.g., based on) second image data BDATA2 and a first data control signal DCS1, which are provided from the first controller 414, and may provide the first data signals to the first display panel 411. The first data control signal DCS1 may be a signal for controlling an operation of the first data driver 413, and may include a load signal (e.g., a data enable signal) for instructing output of a valid data signal, and/or the like.

The first controller 414 may receive first image data BDATA1 and a control signal CS from the outside (e.g., from a graphics processor), may generate the first scan control signal SCS1 and the first data control signal DCS1 according to (e.g., based on) the control signal CS, and may convert the first image data BDATA1 into the second image data BDATA2 corresponding to a pixel arrangement of the first display panel 411. The first scan driver 412, the first data driver 413, and the first controller 414 may be implemented as an integrated circuit, and at least two from among the first scan driver 412, the first data driver 413, and the first controller 414 may be included in (e.g., may be integrally formed as) one integrated circuit.

As shown in FIG. 5, the first display panel 411 may further include a first collimator (e.g., a collimating lens array) LA that converts diffused light emitted from the first display panel 411 (e.g., from the first pixels BP) into parallel light.

The speckle reducer 420 may be disposed in a first direction DR1 with respect to the first display panel 411 (e.g., see FIG. 4), and may cover a light emitting region of the first display panel 411.

The light modulator 430 may be implemented as a liquid crystal display device.

The light modulator 430 may include a second display panel (e.g., a liquid crystal display panel) 431, a second scan driver 432, a second data driver 433, and a second controller 434.

Similar to the first display panel 411, the second display panel 431 may include second scan lines (e.g., first to nth light modulation scan lines) SSL1 to SSLn, second data lines (e.g., first to mth light modulation data lines) SDL1 to SDLm and second pixels SP. The second scan lines SSL1 to SSLn may be arranged with each other along the second direction DR2, and each of the second scan lines SSL1 to SSLn may extend in the third direction DR3. The second data lines SDL1 to SDLm may be arranged with each other along the third direction DR3, and each of the second data lines SDL1 to SDLm may extend in the second direction DR2.

The second pixels SP may be disposed to correspond with (e.g., to correspond one-to-one to) the first pixels BP, and each of the second pixels SP may be connected to at least one of the second scan lines SSL1 to SSLn and to one of the second data lines SDL1 to SDLm. Each of the second pixels SP may include a liquid crystal element, and a transistor (e.g., at least one transistor) that provides a second data signal to the liquid crystal element. The liquid crystal element may polarize incident light corresponding to the second data signal. One pixel of the display device 10_1 may include at least one second pixel SP and at least one first pixel BP.

Similar to the first scan driver 412, the second scan driver 432 may generate a second scan signal according to (e.g., based on) a second scan control signal SCS2, and may provide (e.g., may sequentially provide) the second scan signal to the second scan lines SSL1 to SSLn. The second scan driver 432 may operate to be synchronized with the first scan driver 412. For example, when a first pixel BP is selected by the first scan driver 412, the second scan driver 432 may select a second pixel SP corresponding to the selected first pixel BP.

Similar to the first data driver 413, the second data driver 433 may generate second data signals according to (e.g., based on) second interference pattern data SDATA2 and a second data control signal DCS2, which are provided from the second controller 434.

Similar to the first controller 414, the second controller 434 may receive first interference pattern data SDATA1 and a control signal CS, may generate the second scan control signal SCS2 and the second data control signal DCS2 according to (e.g., based on) the control signal CS, and may convert the first interference pattern data SDATA1 into the second interference pattern data SDATA2 that may be used by the second data driver 433.

The second scan driver 432, the second data driver 433, and the second controller 434 may be implemented as an integrated circuit, and at least two from among the second scan driver 432, the second data driver 433, and the second controller 434 may be included in (e.g., may be integrally formed as) one integrated circuit. In an example embodiment, the second controller 434 may be integrally configured (e.g., may be integrally formed) with the first controller 414.

Referring to FIG. 5, the first display panel 411 may include a first substrate SUB1, and a plurality of light emitting elements LD1 to LD4. The light emitting elements LD1 to LD4 may be disposed on the first substrate SUB1. Each of the light emitting elements LD1 to LD4 may be included in (e.g., may be formed in or may constitute) a first pixel BP. In other words, one light emitting element LD may form (e.g., may constitute) one pixel. The light emitting elements LD1 to LD4 may be distinguished from each other by reference lines LREF1 to LREF5. A partition wall may be disposed between the light emitting elements LD1 to LD4 to prevent or substantially prevent light diffused from adjacent light emitting elements from being introduced to other light emitting elements.

In some embodiments, at least some of the light emitting elements LD1 to LD4 may emit light having different colors (e.g., different single colors) from each other. For example, a first light emitting element LD1 (e.g., and a fourth light emitting element LD4) may emit light having a first color (e.g., a red color), a second light emitting element LD2 may emit light having a second color (e.g., a green color), and a third light emitting element LD3 may emit light having a third color (e.g., a blue color), but the present disclosure is not limited thereto.

The first collimator (e.g., the collimating lens array) LA may include a collimating lens LE corresponding to each of the light emitting elements LD1 to LD4 (e.g., corresponding to the first pixel BP as shown in FIG. 4). The collimating lens LE may convert diffused light emitted from each of the light emitting elements LD1 to LD4 into parallel light.

In some embodiments, a polarizing device for polarizing the parallel light may be disposed on the first collimator LA.

The speckle reducer 420 (e.g., the optical path difference generator) may include a pattern (e.g., an optical structure or a unit optical structure) EU that is repeatedly arranged, and that provides a plurality of optical paths. The pattern EU may be disposed corresponding to each of the light emitting elements LD1 to LD4 (or may be disposed corresponding to each first pixel BP). However, the present disclosure is not limited thereto, and the pattern EU may be disposed corresponding to a plurality of light emitting elements or to a plurality of pixels.

The second display panel 431 of the light modulator 430 may include a second substrate SUB2, and a plurality of liquid crystal elements LC1 to LC4. The liquid crystal elements LC1 to LC4 may be disposed on the second substrate SUB2. As described above, the liquid crystal elements LC1 to LC4 may be disposed corresponding to the respective light emitting elements LD1 to LD4, and may be included in (e.g., may be formed in or may constitute) the second pixel SP.

As described above with reference to FIGS. 4 and 5, the light source 410 may be implemented as a light emitting display device (e.g., an organic light emitting display device), and the light modulator 430 may be implemented as a liquid crystal display device.

Figure 6A:
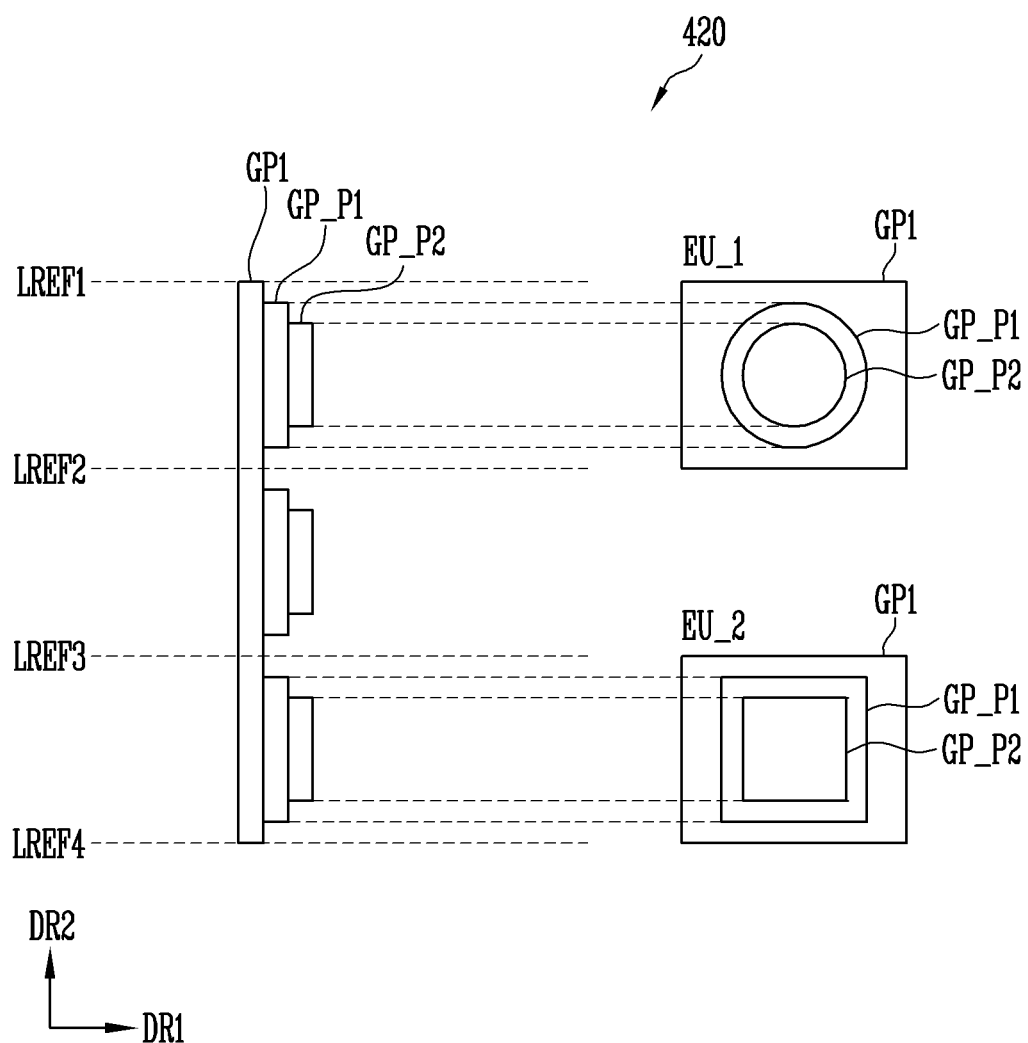
FIGS. 6A-6B are diagrams illustrating various examples of a speckle reducer included in the display device shown in FIG. 5.
Figure 6B:
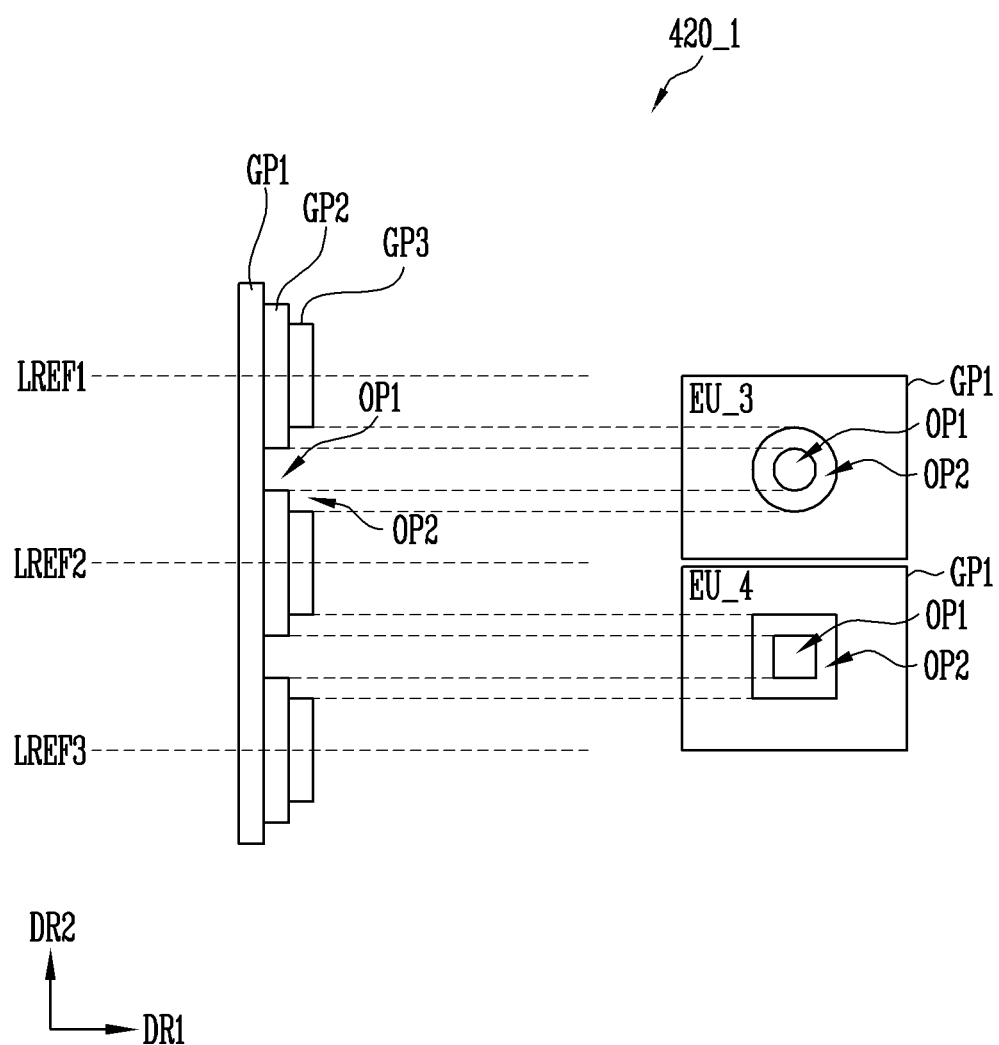

FIGS. 6A and 6B are diagrams illustrating various examples of the speckle reducer included in the display device shown in FIG. 5. Although FIGS. 6A and 6B illustrate an embodiment where each speckle reducer is implemented as the optical path difference generator 121 described with reference to FIG. 3, the present disclosure is not limited thereto. For example, the speckle reducer may further include the light condenser 122, the diffuser 123, and/or the collimator 124 as described with reference to FIG. 2.

Referring to FIGS. 5 and 6A, a speckle reducer 420 (e.g., an optical path difference generator) may include a first layer GP1, a second layer, and a third layer. For convenience, an embodiment where the speckle reducer 420 includes three layers is illustrated in FIGS. 6A and 6B. However, the present disclosure is not limited thereto, and the speckle reducer 420 may include four or more layers, for example.

The second layer may be disposed on the first layer GP1, and may include first sub-patterns GP_P1. The first sub-patterns GP_P1 may be spaced apart from each other with respect to the patterns EU (e.g., see FIG. 5) distinguished by the reference lines LREF1 to LREF4, and a portion of the first layer GP1 may be exposed by the first sub-pattern GP_P1 at (e.g., in or on) the pattern EU. The portion of the first layer GP1, which is exposed by the first sub-pattern GP_P1, may include (e.g., may form or may constitute) the first light emitting surface S_EX1 described above with reference to FIG. 3.

For example, as shown in the plan view of a first pattern EU_1 in FIG. 6A, the first sub-pattern GP_P1 may have a circular planar shape (e.g., a circular shape when viewed in the plan view). However, the present disclosure is not limited thereto, for example, as shown in the plan view of a second pattern EU_2 in FIG. 6A, the first sub-pattern GP_P1 may have a quadrangular planar shape (e.g., a quadrangular shape when viewed in the plan view). However, the planar shapes shown in FIG. 6A are merely illustrative, and the first sub-pattern GP_P1 may have any suitable planar shape, for example, such as a polygonal shape (e.g., a pentagonal shape, a hexagonal shape, and/or the like), an elliptical shape, or another suitable planar shape.

Similarly, the third layer may be disposed on the second layer, and may include second sub-patterns GP_P2. The second sub-patterns GP_P2 may be spaced apart from each other with respect to the patterns EU (e.g., see FIG. 5). The second sub-pattern GP_P2 may have an area smaller than that of the first sub-pattern GP_P1, and may be disposed to overlap with the first sub-pattern GP_P1. A portion of the first sub-pattern GP_P1 may be exposed by the second sub-pattern GP_P2 at (e.g., in or on) the pattern EU. The portion of the first sub-pattern GP_P1, which is exposed by the second sub-pattern GP_P2, may include (e.g., may form or may constitute) the second light emitting surface S_EX2 described above with reference to FIG. 3.

The second sub-pattern GP_P2 may have a shape corresponding to the first sub-pattern GP_P1. For example, the second sub-pattern GP_P2 may have any suitable planar shape, for example, such as a polygonal shape (e.g., a quadrangular shape, a pentagonal shape, a hexagonal shape, and/or the like), a circular shape, an elliptical shape, or another suitable planar shape.

Referring to FIG. 6B, a speckle reducer 420_1 (e.g., an optical path difference generator) may include a first layer GP1, a second layer GP2, and a third layer GP3.

The second layer GP2 may be disposed on the first layer GP1, and may include first openings (e.g., first opening patterns or first holes) OP1. The first openings OP1 may be spaced apart from each other with respect to the patterns EU (e.g., see FIG. 5) distinguished by the reference lines LREF1 to LREF3, and a portion of the first layer GP1 may be exposed by the first opening OP1 at (e.g., in or on) the pattern EU.

For example, as shown in the plan view of a third pattern EU_3 in FIG. 6B, the first opening OP1 may have a circular planar shape (e.g., a circular shape when viewed in the plan view). However, the present disclosure is not limited thereto, for example, as shown in the plan view of a fourth pattern EU_4 in FIG. 6B, the first opening OP1 may have a quadrangular planar shape (e.g., a quadrangular shape when viewed in the plan view). However, the planar shapes shown in FIG. 6B are merely illustrative, and the first opening OP1 may have any suitable planar shape, for example, such as a polygonal shape (e.g., a pentagonal shape, a hexagonal shape, and/or the like), an elliptical shape, or another suitable planar shape.

Similarly, the third layer GP3 may be disposed on the second layer GP2, and may include second openings OP2. The second openings OP2 may be spaced apart from each other with respect to the patterns EU (e.g., see FIG. 5). The second opening OP2 may have an area larger than that of the first opening OP1, and may be disposed to overlap with the first opening OP1. A portion of the first layer GP1 and a portion of the second layer GP2 may be exposed by the second opening OP2 at (e.g., in or on) the pattern EU. The second opening OP2 may have a shape corresponding to the first opening OP1. For example, the second opening OP2 may have any suitable planar shape, for example, such as a polygonal shape (e.g., a quadrangular shape, a pentagonal shape, a hexagonal shape, and/or the like), a circular shape, an elliptical shape, or another suitable planar shape.

As described above with reference to FIGS. 6A and 6B, the speckle reducer (e.g., the optical path difference generator) may include a pattern (e.g., an optical structure or a unit optical structure) EU corresponding to the pixel (e.g., the first pixel BP).

Figure 7A:
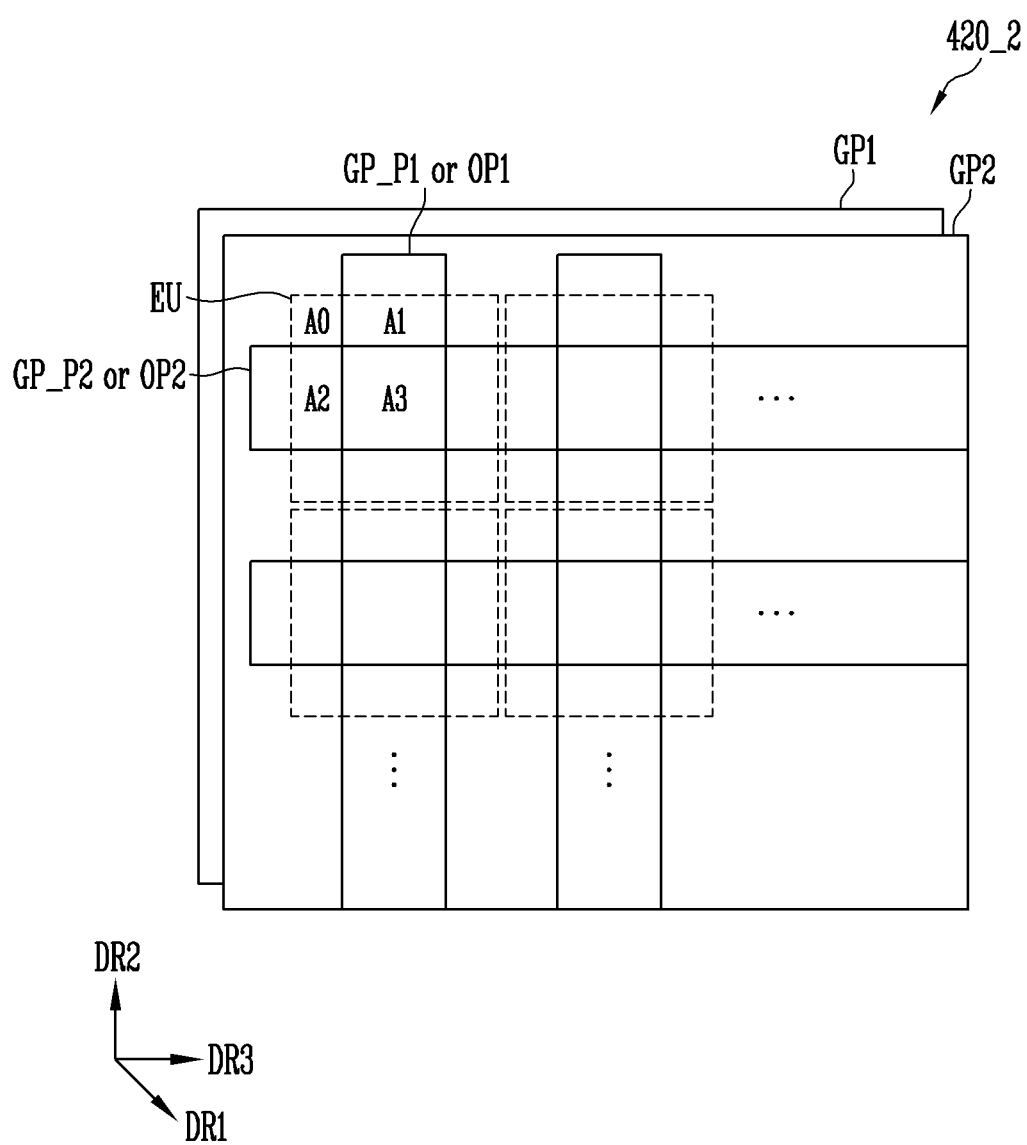
FIGS. 7A-7B are diagrams illustrating various other examples of the speckle reducer included in the display device shown in FIG. 5.
Figure 7B:
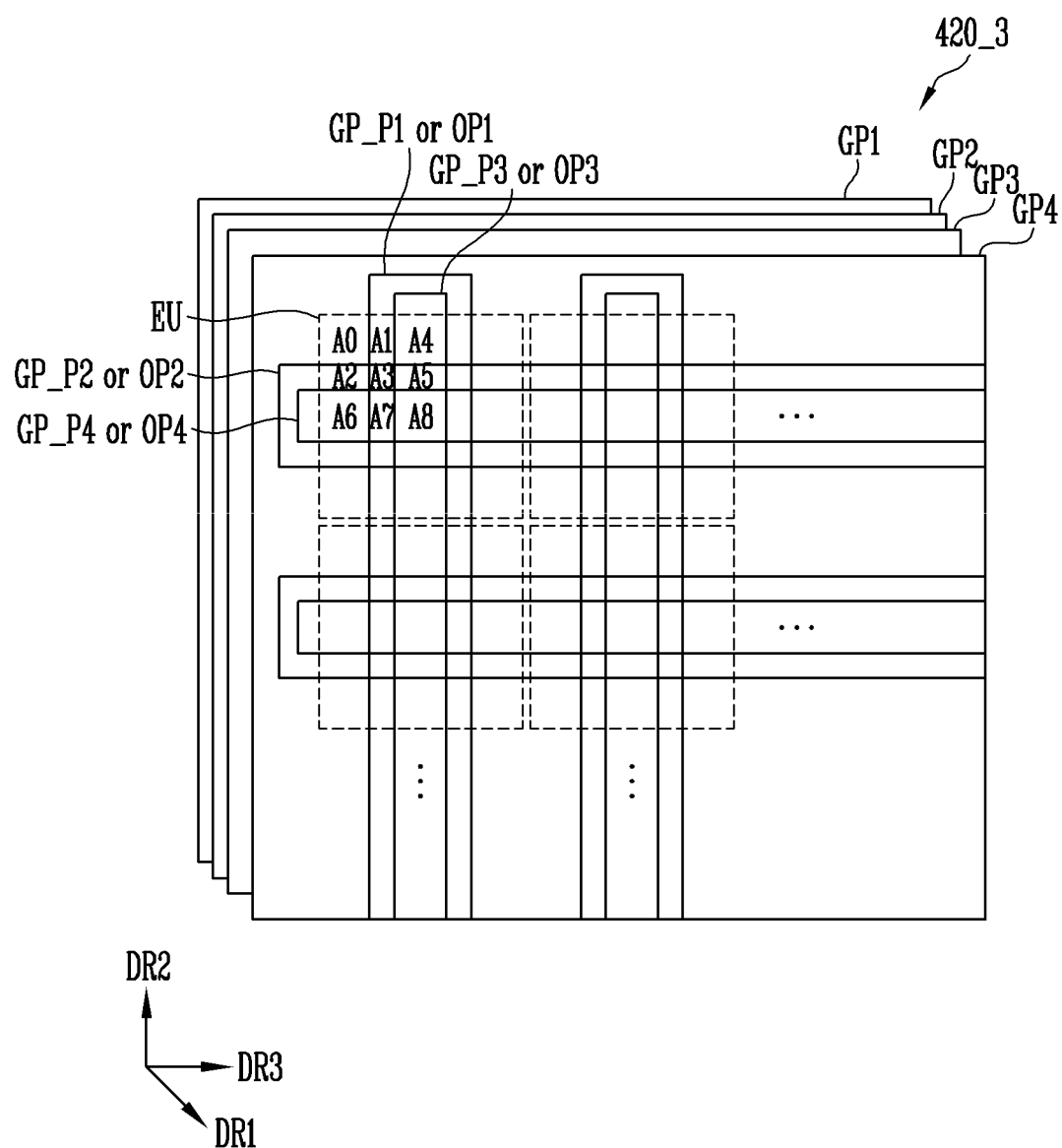

FIGS. 7A and 7B are diagrams illustrating various other examples of the speckle reducer included in the display device shown in FIG. 5. Plan views of a portion of the speckle reducer 420 shown in FIG. 5 are illustrated as examples in FIGS. 7A and 7B.

Referring to FIGS. 4, 5, and 7A, a speckle reducer 420_2 (e.g., an optical path difference generator) may include a first layer GP1 and a second layer GP2.

The first layer GP1 may include a first opening OP1. The first opening OP1 may have a width (e.g., a specific width or a predetermined width), may extend in the second direction DR2, and may be repeatedly arranged along the third direction DR3.

The second layer GP2 may be disposed on the first layer GP1, and may include a second opening OP2. The second opening OP2 may have a width (e.g., a specific width or a predetermined width), may extend in the third direction DR3, and may be repeatedly arranged along the second direction DR2. The second layer GP2 may be the same or substantially the same as (e.g., may be substantially identical to) the first layer GP1, but rotated at 90 degrees on a plane.

A reference region A0, at (e.g., in or on) which the first opening OP1 and the second opening OP2 are not provided (e.g., which does not overlap with the first opening OP1 and the second opening OP2) at (e.g., in or on) a pattern EU, may include (e.g., may form or may constitute) a first light emitting surface from among a plurality of light emitting surfaces of the pattern EU. A first region A1, at (e.g., in or on) which the first opening OP1 is provided and the second opening OP2 is not provided (e.g., which overlaps with the first opening OP1 and does not overlap with the second opening OP2) at (e.g., in or on) the pattern EU, may include (e.g., may form or may constitute) a second light emitting surface. Similarly, a second region A2, at (e.g., in or on) which the second opening OP2 is provided and the first opening OP1 is not provided at (e.g., in or on) the pattern EU, may include (e.g., may form or may constitute) a third light emitting surface, and a third region A3, at (e.g., in or on) which the first opening OP1 and the second opening OP2 are provided (e.g., which overlaps with the first and second openings OP1 and OP2) at (e.g., in or on) the pattern EU, may include (e.g., may form or may constitute) a fourth light emitting surface.

In an embodiment, the second layer GP2 may have a thickness that is different from that of the first layer GP1. For example, the thickness of the second layer GP2 may be twice the thickness of the first layer GP1. The four regions A0 to A3 may provide four optical paths having different lengths from each other.

Although an embodiment where the first layer GP1 and the second layer GP2 include the first opening OP1 and the second opening OP2, respectively, is described with reference to FIG. 7A, the present disclosure is not limited thereto. For example, as described with reference to FIG. 6A, the first layer GP1 may include a first sub-pattern GP_P1 instead of the first opening OP1, and the second layer GP2 may include a second sub-pattern GP_P2 instead of the second opening OP2.

Referring to FIG. 7B, a speckle reducer 420_3 (e.g., an optical path difference generator) may be different from the speckle reducer 420_2 shown in FIG. 7A, in that the speckle reducer 420_3 may further include a third layer GP3 and a fourth layer GP4.

The third layer GP3 may include third openings OP3, and the fourth layer GP4 may include fourth openings OP4. The third opening OP3 and the fourth opening OP4 may be the same or substantially the same as (e.g., may be substantially identical to or similar to) the first opening OP1 and the second opening OP2, respectively, and therefore, redundant description thereof may not be repeated. The third opening OP3 and the fourth opening OP4 may overlap with the first opening OP1 and the second opening OP2, respectively.

A fourth region A4, at (e.g., in or on) which the first opening OP1 and the third opening OP3 are provided at (e.g., in or on) the pattern EU, may include (e.g., may form or may constitute) a fifth light emitting surface from among the plurality of light emitting surfaces of the pattern EU. A fifth region A5, at (e.g., in or on) which the first opening OP1, the second opening OP2, and the third opening OP3 are provided at (e.g., in or on) the pattern EU, may include (e.g., may form or may constitute) a sixth light emitting surface. A sixth region A6, at (e.g., in or on) which the second opening OP2 and the fourth opening OP4 are provided at (e.g., in or on) the pattern EU, may include (e.g., may form or may constitute) a seventh light emitting surface of the pattern EU. Similarly, a seventh region A7, at (e.g., in or on) which the first opening OP1, the second opening OP2, and the fourth opening OP4 are provided at (e.g., in or on) the pattern EU, may include (e.g., may form or may constitute) an eighth light emitting surface of the pattern EU, and an eighth region A8, at (e.g., in or on) which the first opening OP1, the second opening OP2, the third opening OP3, and the fourth opening OP4 are provided at (e.g., in or on) the pattern EU, may include (e.g., may form or may constitute) a ninth light emitting surface of the pattern EU.

When the first to fourth layers GP1 to GP4 have different thicknesses from each other (e.g., when a thickness of an upper layer is twice a thickness of a lower layer), the nine regions A0 to A8 may provide eight optical paths having different lengths from each other.

Although an embodiment where the third layer GP3 and the fourth layer GP4 include the third opening OP3 and the fourth opening OP4, respectively, is described with reference to FIG. 7B, the present disclosure is not limited thereto. For example, as described with reference to FIG. 6A, the third layer GP3 may include a third sub-pattern GP_P3 instead of the third opening OP3, and the fourth layer GP4 may include a fourth sub-pattern GP_P4 instead of the fourth opening OP4.

Figure 8:
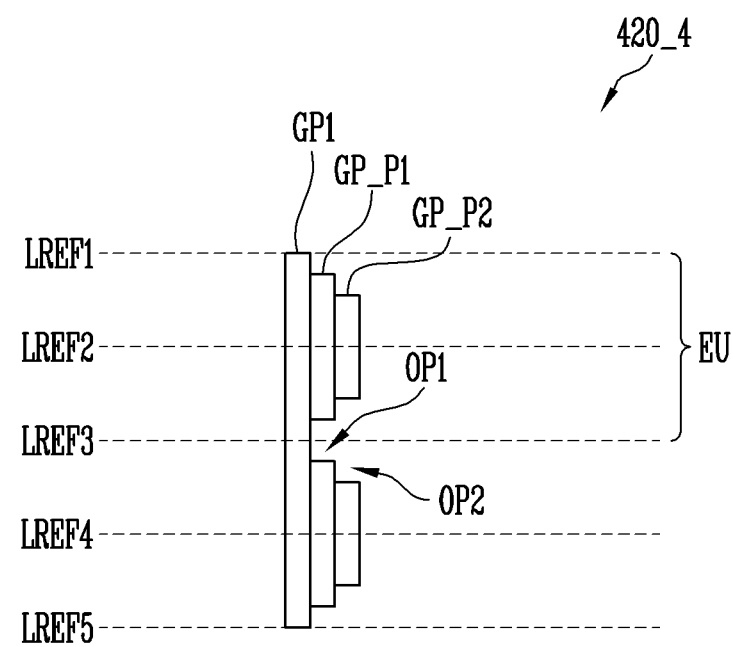
FIG. 8 is a diagram illustrating another example of the speckle reducer included in the display device shown in FIG. 5.

FIG. 8 is a diagram illustrating another example of the speckle reducer included in the display device shown in FIG. 5. A side view of a speckle reducer 420_4 corresponding to the speckle reducer 420 of FIG. 6A is illustrated in FIG. 8.

Referring to FIGS. 5, 6A, and 8, the speckle reducer 420_4 shown in FIG. 8 may be different from the speckle reducer 420 shown in FIG. 6A, in that a pattern EU included in the speckle reducer 420_4 may correspond to two or more of the light emitting elements LD1 to LD4 (e.g., see FIG. 5).

The speckle reducer 420_4 is the same or substantially the same as (e.g., substantially identical to or similar to) the speckle reducer 420 shown in FIG. 6A, except sizes of first and second sub-patterns GP_P1 and GP_P2 in the speckle reducer 420_4 may be different from those of the speckle reducer 420 in FIG. 6A, and therefore, redundant description thereof may not be repeated.

In the pattern EU, each of the first sub-pattern GP_P1 and the second sub-pattern GP_P2 may be symmetrical to each other with respect to (e.g., relative to) a second reference line LREF2. The optical path difference generator 121 described with reference to FIG. 3 may be formed between a first reference line LREF1 and the second reference line LREF2. The optical path difference generator 121 described with reference to FIG. 3 may be formed between the second reference line LREF2 and a third reference line LREF3 to be inverted in the second direction DR2.

As described above with reference to FIG. 8, the pattern EU of the speckle reducer 420_4 may correspond to two pixels in the second direction DR2.

Figure 9A:
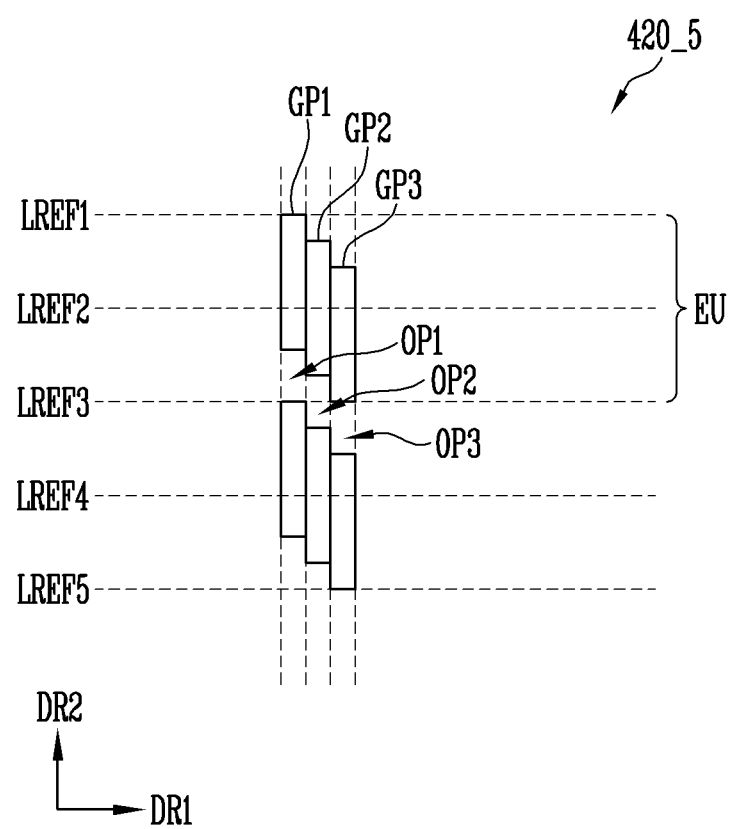
FIGS. 9A-9B are diagrams illustrating another example of the speckle reducer included in the display device shown in FIG. 5.
Figure 9B:
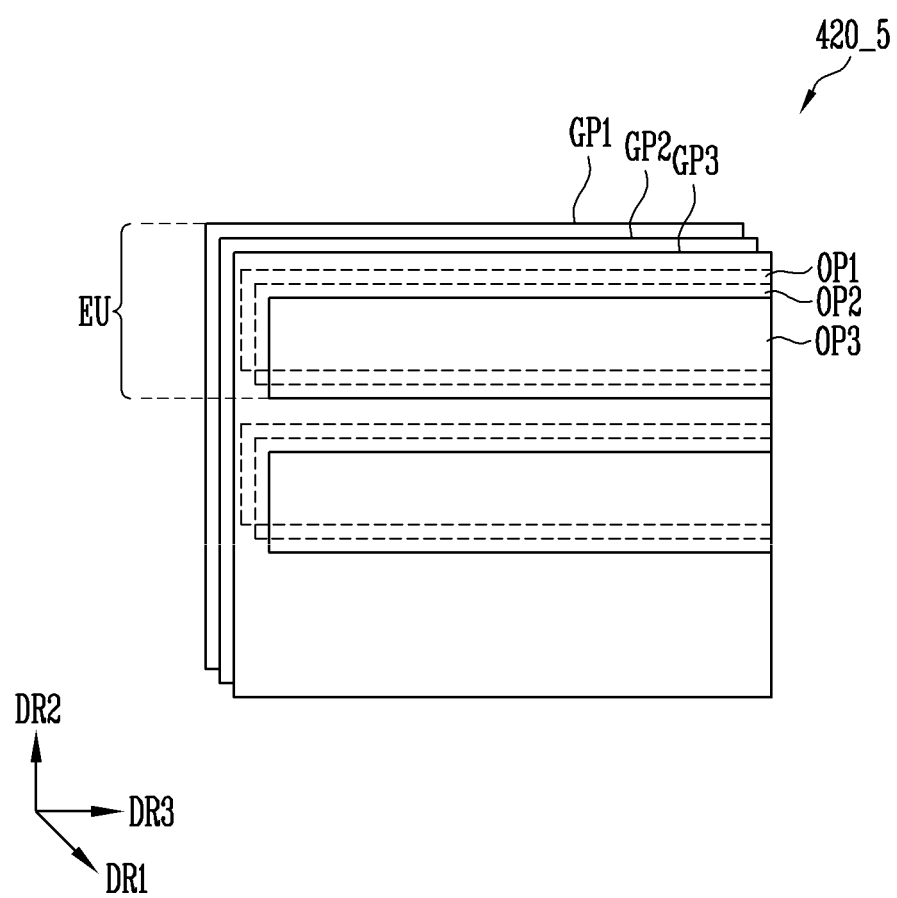

FIGS. 9A and 9B are diagrams illustrating another example of the speckle reducer included in the display device shown in FIG. 5. A side view of a speckle reducer 420_5 (e.g., an optical path difference generator) is illustrated in FIG. 9A, and a plan view of the speckle reducer 420_5 is illustrated in FIG. 9B.

Referring to FIGS. 5, 9A, and 9B, the speckle reducer 420_5 may include a first layer GP1, a second layer GP2, and a third layer GP3.

The first layer GP1 may include a first opening OP1. The first opening OP1 may have a width (e.g., a specific width or a predetermined width) in the second direction DR2, may extend in the third direction DR3, and may be repeatedly arranged along the second direction DR2. The first opening OP1 may be disposed corresponding to two pixels in the second direction DR2 (e.g., between a first reference line LREF1 and a third reference line LREF3). However, the present disclosure is not limited thereto.

The second layer GP2 may include a second opening OP2. The second opening OP2 may have a width (e.g., a specific width or a predetermined width) in the second direction DR2, may extend in the third direction DR3, and may be repeatedly arranged along the second direction DR2. The width of the second opening OP2 in the second direction DR2 may be equal to or substantially equal to that of the first opening OP1 in the second direction DR2. The second opening OP2 may partially overlap with the first opening OP1 in the first direction DR1. In other words, the second opening OP2 may be disposed to partially miss (e.g., to partially not overlap with) the first opening OP1.

Similarly, the third layer GP3 may include a third opening OP3. The third opening OP3 may have a width (e.g., a specific width or a predetermined width) in the second direction DR2, may extend in the third direction DR3, and may be repeatedly arranged along the second direction DR2. The width of the third opening OP3 in the second direction DR2 may be equal to or substantially equal to that of the first opening OP1 in the second direction DR2. The third opening OP3 may partially overlap with the second opening OP2 in the first direction DR1, and may partially overlap with (or not overlap with) the first opening OP1. In other words, the first opening OP1, the second opening OP2, and the third opening OP3 may be disposed to partially miss (e.g., to partially not overlap with) each other.

The optical path difference generator 121 described with reference to FIG. 3 may be provided between each of the reference lines LREF1 to LREF5.

Figure 10:
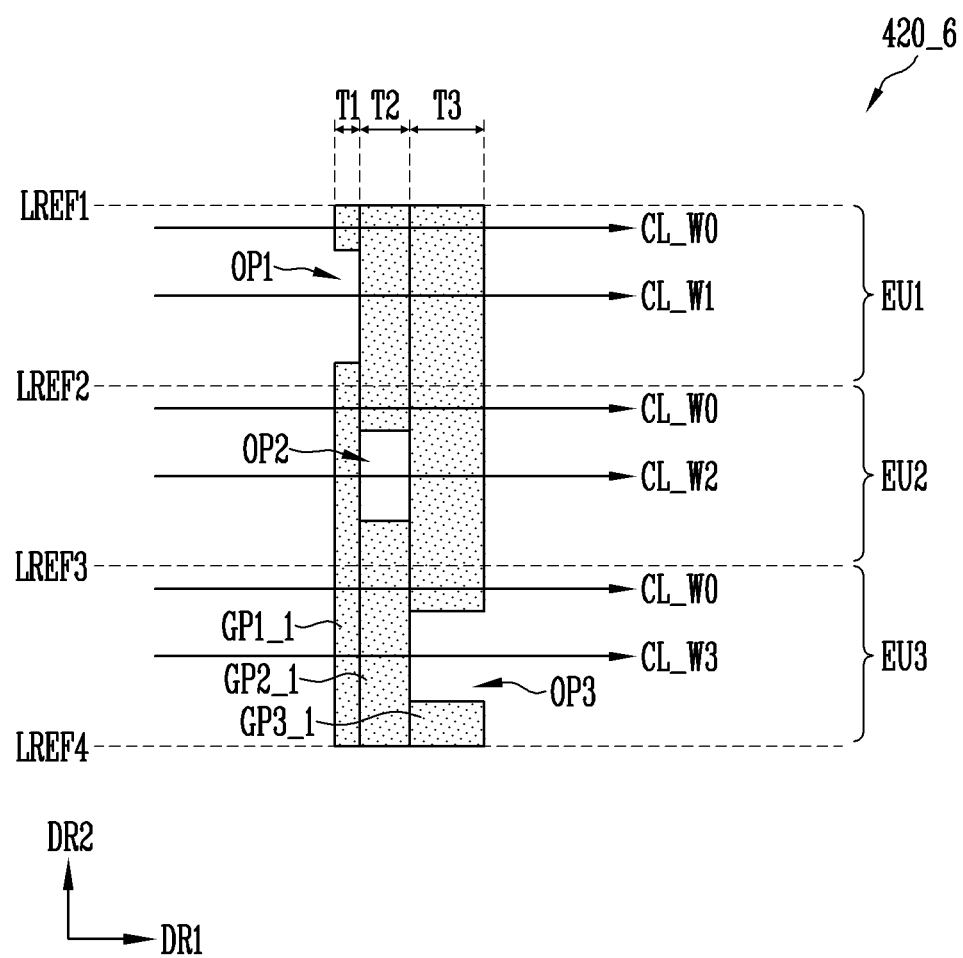
FIG. 10 is a diagram illustrating another example of the speckle reducer included in the display device shown in FIG. 5.

FIG. 10 is a diagram illustrating another example of the speckle reducer included in the display device shown in FIG. 5. A side view of a speckle reducer 420_6 (e.g., an optical path difference generator) is illustrated in FIG. 10.

Referring to FIGS. 5 and 10, the speckle reducer 420_6 may include a first layer GP1_1, a second layer GP2_1, and a third layer GP3_1.

The first layer GP1_1, the second layer GP2_1, and the third layer GP3_1 may have different thicknesses from each other.

For example, a first thickness T1 of the first layer GP1_1 may correspond to a light (e.g., a wavelength of the light) emitted from the first light emitting element LD1 (e.g., a red colored light) described with reference to FIG. 5. A second thickness T2 of the second layer GP2_1 may correspond to a light (e.g., a green colored light or a wavelength of the green colored light) emitted from the second light emitting element LD2 described with reference to FIG. 5, and a third thickness T3 of the third layer GP3_1 may correspond to a light (e.g., a blue colored light or a wavelength of the blue colored light) emitted from the third light emitting element LD3 described with reference to FIG. 5.

The first layer GP1_1 may include a first opening OP1. The first opening OP1 may be provided between a first reference line LREF1 and a second reference line LREF2 (e.g., corresponding to the first light emitting element LD1 described with reference to FIG. 5). A first wave CL_W1 transmitted through the first opening OP1 between the first reference line LREF1 and the second reference line LREF2 may have an optical path difference (or phase difference) corresponding to the first thickness T1, with respect to a reference wave CL_W0 that is transmitted while avoiding the first opening OP1.

The second layer GP2_1 may include a second opening OP2. The second opening OP2 may be provided between the second reference line LREF2 and a third reference line LREF3 (e.g., corresponding to the second light emitting element LD2 described with reference to FIG. 5). A second wave CL_W2 transmitted through the second opening OP2 between the second reference line LREF2 and the third reference line LREF3 may have an optical path difference (or a phase difference) corresponding to the second thickness T2, with respect to the reference wave CL_W0.

The third layer GP3_1 may include a third opening OP3. The third opening OP3 may be provided between the third reference line LREF3 and a fourth reference line LREF4 (e.g., corresponding to the third light emitting element LD3 described with reference to FIG. 5). A third wave CL_W3 transmitted through the third opening OP3 between the third reference line LREF3 and the fourth reference line LREF4 may have an optical path difference (or a phase difference) corresponding to the third thickness T3, with respect to the reference wave CL_W0.

In other words, the speckle reducer 420_6 may provide different patterns (e.g., different optical structures or different unit optical structures) EU (e.g., see FIG. 5), corresponding to the light emitting elements LD1 to LD3 (e.g., see FIG. 5).

In the backlight device and the holographic 3D image display device in accordance with one or more embodiments of the present disclosure, different optical paths may be provided with respect to coherent light through an optical path difference generator. Different phases may be provided to the coherent light transmitted through the optical path difference generator, and different speckles may be generated to overlap with each other due the different phases. Thus, speckle brightness may be reduced, and the speckle (e.g., any speckle) may not be viewed (e.g., may not be easily viewable or may not be easily noticeable).

While various example embodiments have been disclosed herein, and although specific terms are employed to describe the example embodiments, they are used and are to be interpreted in a generic and descriptive sense only and not for purpose of limitation. In some cases, as would be apparent to those ordinarily skilled in the art, features, characteristics, and/or elements described in connection with a particular embodiment may be used singly or in combination with features, characteristics, and/or elements described in connection with other embodiments, unless otherwise specifically indicated. Accordingly, it will be understood by those skilled in the art that various modifications and changes in form and/or details may be made to the example embodiments disclosed herein, without departing from the spirit and scope of the present disclosure as set forth in the following claims, and their equivalents.

What is claimed is:

1. A backlight device comprising:
    a light source configured to emit coherent light;
    an optical path difference generator on the light source, the optical path difference generator comprising an incident surface and a plurality of light emitting surfaces, the light emitting surfaces being parallel to the incident surface and having different separation distances from the incident surface;
    a light condenser on the optical path difference generator;
    a diffuser on the light condenser; and
    a collimator on the diffuser.

2. The backlight device of claim 1, wherein the optical path difference generator comprises:
    a first layer; and
    a second layer on the first layer, the second layer partially overlapping with the first layer,
    wherein a portion of the first layer is exposed by the second layer, and comprises a first light emitting surface from among the plurality of light emitting surfaces, and
    wherein at least a portion of the second layer overlaps with the first layer, and comprises a second light emitting surface from among the plurality of light emitting surfaces.

3. The backlight device of claim 2, wherein a thickness of the second layer is greater than a temporal coherence length of the coherent light.

4. The backlight device of claim 3, wherein the temporal coherence length is defined as a distance where the coherent light is moved for a delay time, and
wherein the delay time is defined as an amount of time until coherence between the coherent light and delayed light is decreased to a value of 0, the coherence being obtained by delaying the coherent light by the delay time.

5. The backlight device of claim 2, wherein a thickness of the second layer is equal to that of the first layer.

6. The backlight device of claim 2, wherein an area of the second layer is less than that of the first layer in a plan view.

7. The backlight device of claim 2, wherein an area of the first light emitting surface is equal to that of the second light emitting surface.

8. A display device comprising:
a backlight device; and
a light modulator on the backlight device,
wherein the backlight device comprises:
   a light source configured to emit coherent light in a first direction; and
   an optical path difference generator on the light source, the optical path difference generator comprising an incident surface and a plurality of light emitting surfaces, the light emitting surfaces being parallel to the incident surface and having different separation distances from the incident surface, and
wherein the plurality of light emitting surfaces comprises a first light emitting surface and a second light emitting surface that are spaced from each other in the first direction.

9. A display device comprising:
a backlight device; and
a light modulator on the backlight device,
wherein the backlight device comprises:
   a light source configured to emit coherent light; and
   an optical path difference generator on the light source, the optical path difference generator comprising an incident surface and a plurality of light emitting surfaces, the light emitting surfaces being parallel to the incident surface and having different separation distances from the incident surface,
wherein the light source comprises:
   a display panel comprising a plurality of pixels, each of the pixels comprising a light emitting element; and
   a first collimator on the display panel, the first collimator comprising a plurality of collimating lenses respectively corresponding to the pixels,
wherein the optical path difference generator comprises a pattern comprising each of the light emitting surfaces, the pattern being repeatedly arranged, and
wherein the pattern of the optical path difference generator corresponds to at least one pixel of the plurality of pixels.

10. The display device of claim 9, wherein the light modulator comprises a liquid crystal display panel comprising a plurality of liquid crystal elements respectively corresponding to the pixels.

11. The display device of claim 9, wherein the pattern comprises:
a first sub-pattern at a first layer; and
a second sub-pattern at a second layer different from the first layer, the second sub-pattern having an area smaller than that of the first sub-pattern,
wherein a portion of the first sub-pattern is exposed by the second sub-pattern, and comprises a first light emitting surface from among the plurality of light emitting surfaces, and
wherein at least a portion of the second sub-pattern overlaps with the first sub-pattern, and comprises a second light emitting surface from among the plurality of light emitting surfaces.

12. The display device of claim 11, wherein each of the first sub-pattern and the second sub-pattern has a circular planar shape or a quadrangular planar shape.

13. The display device of claim 9, wherein the pattern comprises:
a first layer having a first opening; and
a second layer on the first layer, the second layer having a second opening overlapping with the first opening,
wherein a portion of the first layer is exposed by the second opening, and comprises a first light emitting surface from among the plurality of light emitting surfaces, and
wherein at least a portion of the second layer does not overlap with the first opening, and comprises a second light emitting surface from among the plurality of light emitting surfaces.

14. The display device of claim 9, wherein:
the optical path difference generator comprises a first layer and a second layer on the first layer;
the first layer has a first opening having a width, the first opening extending in a first direction, and being repeatedly arranged along a second direction crossing the first direction; and
the second layer comprises a second opening having a width, the second opening extending in the second direction, and being repeatedly arranged along the first direction.

15. The display device of claim 14, wherein a thickness of the first layer is greater than a temporal coherence length of the coherent light, and
wherein a thickness of the second layer is greater than that of the first layer.

16. The display device of claim 9, wherein:
the pattern of the optical path difference generator corresponds to at least two of the pixels;
the optical path difference generator comprises a first layer and a second layer on the first layer;
each of the first layer and the second layer has an opening extending in a first direction, the opening being repeatedly arranged along a second direction crossing the first direction; and
the opening of the first layer partially overlaps with the opening of the second layer.

17. The display device of claim 9, wherein the backlight device further comprises:
a light condenser on the optical path difference generator;
a diffuser on the light condenser; and
a second collimator on the diffuser.

* * * * *